United States Patent
Inaguma et al.

(10) Patent No.: US 10,458,305 B2
(45) Date of Patent: Oct. 29, 2019

(54) METAL SUBSTRATE FOR CATALYTIC CONVERTER AND CATALYST CARRIER

(71) Applicant: NIPPON STEEL & SUMIKIN MATERIALS CO., LTD., Tokyo (JP)

(72) Inventors: Tooru Inaguma, Tokyo (JP); Shinji Kawasoe, Tokyo (JP); Yasuhiro Tsumura, Tokyo (JP); Shogo Konya, Tokyo (JP); Masayuki Kasuya, Tokyo (JP); Masafumi Omizu, Tokyo (JP)

(73) Assignee: NIPPON STEEL CHEMICAL & MATERIAL CO., LTD., Tokyo (JP)

(*) Notice: Subject to any disclaimer, the term of this patent is extended or adjusted under 35 U.S.C. 154(b) by 52 days.

(21) Appl. No.: 15/736,659

(22) PCT Filed: Oct. 4, 2016

(86) PCT No.: PCT/JP2016/079533
§ 371 (c)(1),
(2) Date: Dec. 14, 2017

(87) PCT Pub. No.: WO2017/061439
PCT Pub. Date: Apr. 13, 2017

(65) Prior Publication Data
US 2018/0258816 A1 Sep. 13, 2018

(30) Foreign Application Priority Data
Oct. 6, 2015 (JP) .................... 2015-198746

(51) Int. Cl.
*F01N 3/28* (2006.01)
*B01J 21/04* (2006.01)
(Continued)

(52) U.S. Cl.
CPC ........... *F01N 3/2814* (2013.01); *B01D 53/94* (2013.01); *B01D 53/944* (2013.01);
(Continued)

(58) Field of Classification Search
CPC . B01J 21/04; B01J 23/745; B01J 23/86; B01J 23/862; B01J 32/00; B01J 35/04; F01N 3/28; F01N 3/2814
See application file for complete search history.

(56) References Cited

U.S. PATENT DOCUMENTS 4,318,828 A * 3/1982 Chapman ........... B01D 53/9454
148/284
4,588,449 A * 5/1986 Sigler ....................... C23C 8/10
148/285
(Continued)

FOREIGN PATENT DOCUMENTS

EP 1867389 A1 12/2007
GB 2081747 A 2/1982
(Continued)

OTHER PUBLICATIONS

PCT, "Notification of Transmittal of Translation of the International Preliminary Report on Patentability for International Application No. PCT/JP2016/079533," dated Apr. 19, 2018.
(Continued)

*Primary Examiner* — Cam N. Nguyen
(74) *Attorney, Agent, or Firm* — Manabu Kanesaka (57) ABSTRACT

A base for supporting a catalyst for exhaust gas purification, the base including a honeycomb structure obtained by superposing a metallic flat foil and a metallic wavy foil, characterized in that the wavy foil has offset portions where any adjoining two of the wave phases arranged in the axial direction of the honeycomb structure are offset from each other. The base is further characterized in that an oxide coating film has been formed in a given range of these offset portions which includes exposed edge surfaces that are exposed on the gas-inlet side, that the oxide coating film includes 30-99.9 mass % first alumina, with the remainder comprising at least one of second aluminas, Fe oxides, and
(Continued)

Cr oxides, that the first alumina comprises α-alumina, that the second aluminas comprise one or more of γ-, θ-, χ-, δ-, η-, and κ-aluminas.

20 Claims, 5 Drawing Sheets

(51) Int. Cl.
  *B01J 23/745* (2006.01)
  *B01J 23/86* (2006.01)
  *B01J 32/00* (2006.01)
  *B01J 35/04* (2006.01)
  *B01D 53/94* (2006.01)

(52) U.S. Cl.
  CPC .......... *B01D 53/9418* (2013.01); *B01J 21/04* (2013.01); *B01J 23/745* (2013.01); *B01J 23/86* (2013.01); *B01J 23/862* (2013.01); *B01J 32/00* (2013.01); *B01J 35/04* (2013.01); *F01N 3/28* (2013.01); *F01N 2330/02* (2013.01); *F01N 2370/02* (2013.01); *F01N 2510/00* (2013.01)

(56) References Cited

U.S. PATENT DOCUMENTS

| | | | | |
|---|---|---|---|---|
| 4,665,051 A | * | 5/1987 | Nonnenmann | B01J 35/04 422/180 |
| 4,678,770 A | * | 7/1987 | Wan | B01D 53/945 423/213.5 |
| 4,900,712 A | * | 2/1990 | Bar-Ilan | B01J 37/0221 423/213.5 |
| 4,959,342 A | * | 9/1990 | Shibata | B01D 53/86 502/439 |
| 5,051,294 A | * | 9/1991 | Lunkas | B01J 35/04 156/205 |
| 5,070,694 A | * | 12/1991 | Whittenberger | F01N 3/2026 422/174 |
| 5,288,470 A | * | 2/1994 | Cornelison | B01D 53/945 422/174 |
| 5,306,890 A | * | 4/1994 | Minamida | B21D 47/00 219/121.64 |
| 5,334,570 A | * | 8/1994 | Beauseigneur | B01J 23/40 502/240 |
| 5,403,558 A | * | 4/1995 | Kono | B01J 35/04 422/179 |
| 5,486,338 A | * | 1/1996 | Ota | B01J 35/04 422/174 |
| 5,512,324 A | * | 4/1996 | Paulus | B01J 35/0033 427/379 |
| 5,612,277 A | * | 3/1997 | Harkonen | B01J 35/04 422/175 |
| 6,087,298 A | * | 7/2000 | Sung | B01D 53/945 502/333 |
| 6,617,045 B2 | * | 9/2003 | Okazaki | B01J 35/04 428/593 |
| 6,659,333 B2 | * | 12/2003 | Wieres | B23K 1/0014 228/181 |
| 6,689,328 B1 | * | 2/2004 | Otani | B01J 35/04 422/180 |
| 8,722,572 B2 | * | 5/2014 | Kodama | B01J 35/04 422/180 |
| 2002/0132730 A1 | * | 9/2002 | Hwang | A47L 19/04 502/212 |
| 2003/0073561 A1 | * | 4/2003 | Utsumi | B01D 53/885 493/464 |
| 2009/0148357 A1 | | 6/2009 | Kaneeda et al. | |
| 2012/0247076 A1 | * | 10/2012 | Horimura | B01J 35/04 55/521 |
| 2017/0274367 A1 | * | 9/2017 | Burroughs | B01J 37/0225 |

FOREIGN PATENT DOCUMENTS

| | | |
|---|---|---|
| JP | H04-156945 A | 5/1992 |
| JP | H05-043984 A | 2/1993 |
| JP | H05-184926 A | 7/1993 |
| JP | H08-299808 A | 11/1996 |
| JP | 2006-223925 A | 8/2006 |
| JP | 2007-014831 A | 1/2007 |
| JP | 2007-203256 A | 8/2007 |
| JP | 2008-264596 A | 11/2008 |
| JP | 2011-103243 A | 5/2011 |
| JP | 2015-157272 A | 9/2015 |
| WO | 2015/121910 A1 | 8/2015 |

OTHER PUBLICATIONS

PCT/IB/373, "International Preliminary Report on Patentability for International Application No. PCT/JP2016/079533," dated Apr. 10, 2018.
PCT/ISA/237, "Written Opinion of the International Searching Authority for International Application No. PCT/JP2016/079533," dated Nov. 15, 2016.
Europe Patent Office, "Search Report for European Application No. 16853593.8," dated Mar. 26, 2019.
PCT International Search Report of PCT/JP2016/079533 "PCT/ISA/210" dated Nov. 15, 2016.
PCT Opinion of PCT/JP2016/079533 "PCT/ISA/237" in Japanese dated Nov. 15, 2016.

* cited by examiner

EXHAUST GAS FLOWING DIRECTION (AXIAL DIRECTION)

FIG. 3

EXHAUST GAS FLOWING DIRECTION (AXIAL DIRECTION)

EXHAUST GAS FLOWING DIRECTION (AXIAL DIRECTION)

FIG. 6

EXHAUST GAS FLOWING DIRECTION (AXIAL DIRECTION)

METAL SUBSTRATE FOR CATALYTIC CONVERTER AND CATALYST CARRIER

RELATED APPLICATIONS

The present application is National Phase of International Application No. PCT/JP2016/079533 filed Oct. 4, 2016, and claims priority from Japanese Application No. 2015-198746, filed Oct. 6, 2015, the disclosure of which is hereby incorporated by reference herein in its entirety.

TECHNICAL FIELD

The present invention relates to a metal substrate for catalytic converter used for purifying exhaust gas, and the like.

BACKGROUND ART

As one of devices for converting $NO_x$ contained in diesel exhaust gas into harmless substances, urea selective catalytic reduction (hereinafter abbreviated as SCR) is practically applied.

The SCR is a system of hydrolyzing aqueous urea jetted on an inlet side of an SCR reactor vessel by heat of exhaust gas to produce ammonia, and reducing nitrogen oxides (NOx) in the exhaust gas and the ammonia using an SCR catalyst in the SCR reactor vessel to convert them into harmless substances such as nitrogen and water.

A diesel particulate filter (DPF) for capturing a diesel particulate matter (hereinafter referred to as PM) and a diesel oxidation catalyst (DOC) for oxidizing unburned fuel are connected to an upstream side of the SCR. The temperature of exhaust gas flowing through the SCR reactor vessel varies in a wide range of 200° C. during low loading (at the time of starting of an engine, etc.) to 600° C. during reproduction of DPF.

In recent years, it is investigated that a catalyst carrier of a honeycomb structure that carries a catalyst is applied to SCR, DOC, and the like. As a catalyst carrier, a catalyst carrier for purifying exhaust gas has been known (see, for example, Patent Literature 1). In the catalyst carrier, a honeycomb structured body having a roll shape in which a band-shaped corrugated metal foil and a band-shaped flat metal foil are wound in a multilayer shape is inserted into an outer jacket, and a catalytic material is attached to the corrugated metal foil and the flat metal foil. The corrugated metal foil has many fins having different phases between the front and rear in an axial direction in which the foils are wound (i.e., an offset structure).

CITATION LIST

Patent Literature

Patent Literature 1: JP4719180
Patent Literature 2: JP2007-14831
Patent Literature 3: JP2007-203256

SUMMARY OF INVENTION

Technical Problem

The inventor of the present invention has found that when the above-described catalyst carrier having an offset structure was applied to SCR and DOC and an exhaust gas purification test was performed, an end surface on a gas inlet side of each fin was lost. Exhaust gas flowing into DOC contains PM. Therefore, it is considered that when the exhaust gas containing the PM collides with the end surface on the gas inlet side of each fin, the catalyst is decreased or peeled, and staring from the lost part, a wind erosion region expands. In a case of SCR, a solid material derived from urea may be contained in hydrolyzed ammonia. Therefore, it is considered that when exhaust gas containing the solid material collides with the end surface on the inlet side of each fin, the catalyst is decreased or peeled, and starting from the lost part, a wind erosion region expands.

Particles are also contained in exhaust gas from vehicles in which driving energy is generated by combustion of gasoline. When the above-described catalyst carrier having the offset structure is applied to a purification device for purifying this exhaust gas, the above-described problem of wind erosion occurs.

When a catalyst carrier having no offset structure is used for the above-described applications, a part where wind erosion may occur is restricted to only the end surface on the inlet side of the catalyst carrier. In contrast, when the catalyst carrier having the offset structure is used, wind erosion occurs on all of end surfaces on an inlet side of many fins. Therefore, the catalyst carrier having the offset structure is deteriorated earlier than the catalyst carrier having no offset structure.

Herein, Patent Literature 2 discloses a catalytic converter for purifying exhaust gas having excellent high-temperature oxidation resistance in which a catalyst layer is formed on a metal honeycomb metal substrate that is obtained by working a stainless foil. In the catalytic converter, bonded parts of the stainless foil and another stainless foil are formed by diffusion bonding, a precursor film is formed on a surface of the stainless foil. The precursor film is formed from an oxide. The oxide contains at least one or more of $\alpha$, $\gamma$, $\theta$, $\chi$, $\delta$, $\eta$, and $\kappa$ aluminas that are classified by crystalline structures, and the catalyst layer contains an alkaline metal component.

In Patent Literature 2, there is a problem in which the high-temperature oxidation resistance of the stainless foil is deteriorated and the durability of the metal substrate at high temperature is deteriorated when a promoter containing the alkaline metal component is carried on the catalyst layer. Therefore, the above-described wind erosion is not considered.

Patent Literature 3 discloses a catalytic converter for purifying exhaust gas including a metal honeycomb metal substrate obtained by working a stainless foil and a catalyst layer formed on the stainless foil. In the catalytic converter, the stainless foil contains at least Fe, Cr, and Al, an oxide film is formed on a surface of the stainless foil by oxidation of a component for the stainless foil, and the concentration of Fe contained in the oxide film is 0.1% by mass or more and 7% by mass or less relative to the oxide.

In Patent Literature 3, an object is to suppress the thermal degradation of the catalyst layer during using the catalytic converter for purifying exhaust gas in an environment where the temperature is higher than 900° C. Therefore, the above-described wind erosion is not considered, like Patent Literature 2.

An object of the invention of the present application is to protect each end surface on a gas inlet side of an offset structure provided in a catalyst carrier against wind erosion.

Solution to Problem

In order to solve the above-described problems, the invention of the present application provides as follows. (1) A metal substrate for catalytic converter for purifying exhaust gas, including a honeycomb core including a flat metal foil and a corrugated metal foil, the flat metal foil and the corrugated metal foil being layered, wherein the corrugated foil has an offset part having different wave phases between the front and rear in the axial direction of the honeycomb core, the offset part has an oxide film at a predetermined region containing an exposed end surface that is exposed toward at least a gas inlet side, the oxide film contains 30% by mass or more and 99.9% by mass or less of a first alumina with the balance including at least one of a second alumina, a Fe oxide, and a Cr oxide, the first alumina includes α-alumina, the second alumina includes at least one or more of γ, θ, χ, δ, η, and κ aluminas, and the predetermined region ranges a region that is from the exposed end surface to at least 2 mm in a direction in which gas flows.

(2) The metal substrate for catalytic converter according to (1), wherein the content of Fe contained in the oxide film is 0.1% by mass or more and 7% by mass or less.

(3) The metal substrate for catalytic converter according to (1) or (2), wherein the content of Cr contained in the oxide film is 0.1% by mass or more and 4% by mass or less.

(4) The metal substrate for catalytic converter according to any one of (1) to (3), wherein the oxide film has a thickness of 100 nm or more and 10 μm or less.

(5) The metal substrate for catalytic converter according to any one of (1) to (4), wherein the honeycomb core is formed from a stainless foil, and contains at least Fe, Cr, and Al, the total amount of Cr contained in the stainless foil and the oxide film of the honeycomb core is 9% by mass or more and 30% by mass or less, and the total amount of Al contained in the stainless foil and the oxide film of the honeycomb core is 1.5% by mass or more and 13% by mass or less.

(6) A catalyst carrier including the metal substrate for catalytic converter according to any one of (1) to (5), and a catalyst carried on the flat foil and the corrugated foil.

(7) The catalyst carrier according to (6), used for a purification device for purifying diesel exhaust gas.

(8) The catalyst carrier according to (6), used for a purification device for purifying exhaust gas from combustion of gasoline.

Advantageous Effects of Invention

According to the present invention, an oxide film containing a large amount of α-alumina can protect each end surface on a gas inlet side of an offset structure provided in a catalyst carrier against wind erosion.

DESCRIPTION OF EMBODIMENTS

Figure 1:
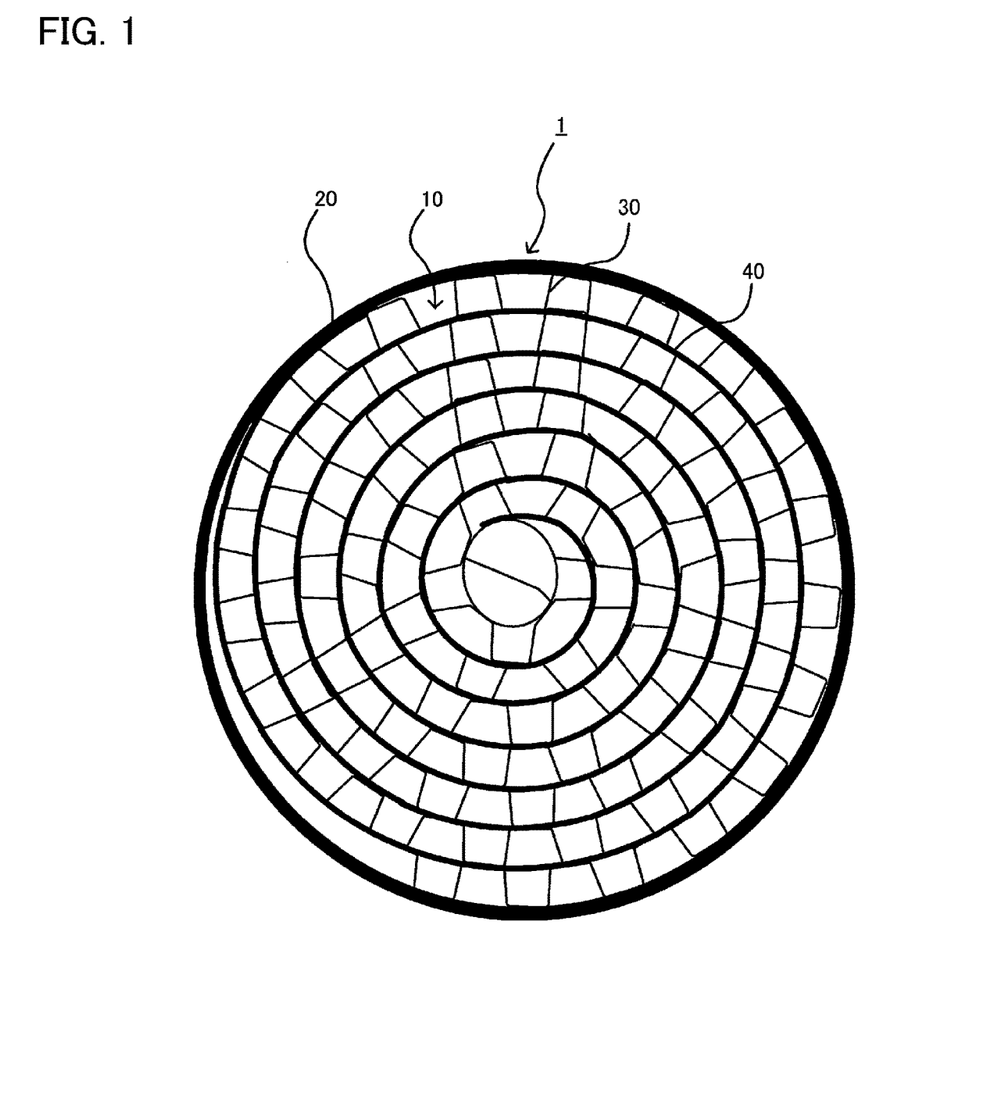
FIG. 1 is a schematic view of a catalyst carrier.
Figure 2:
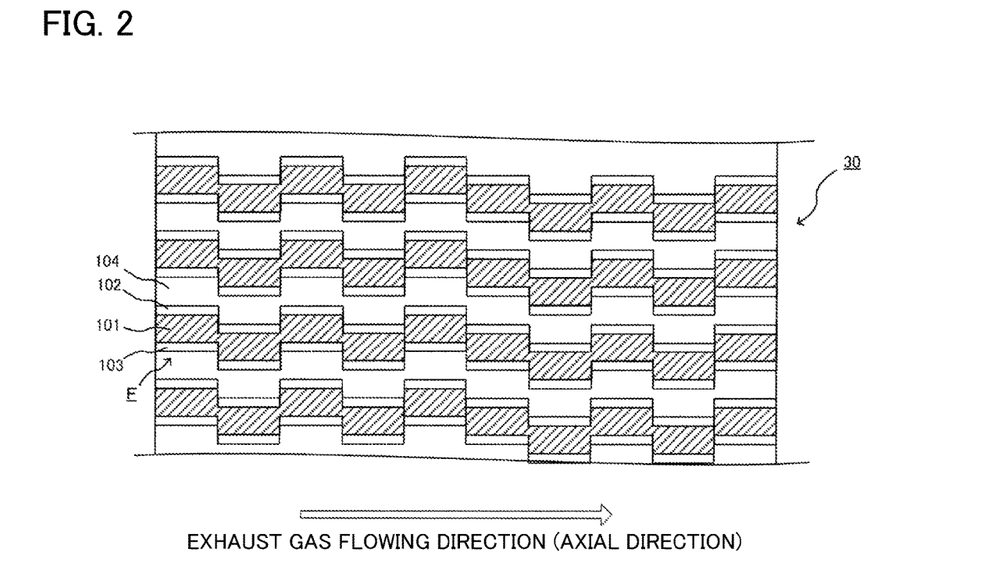
FIG. 2 is a development view in a part of a corrugated foil.
Figure 3:
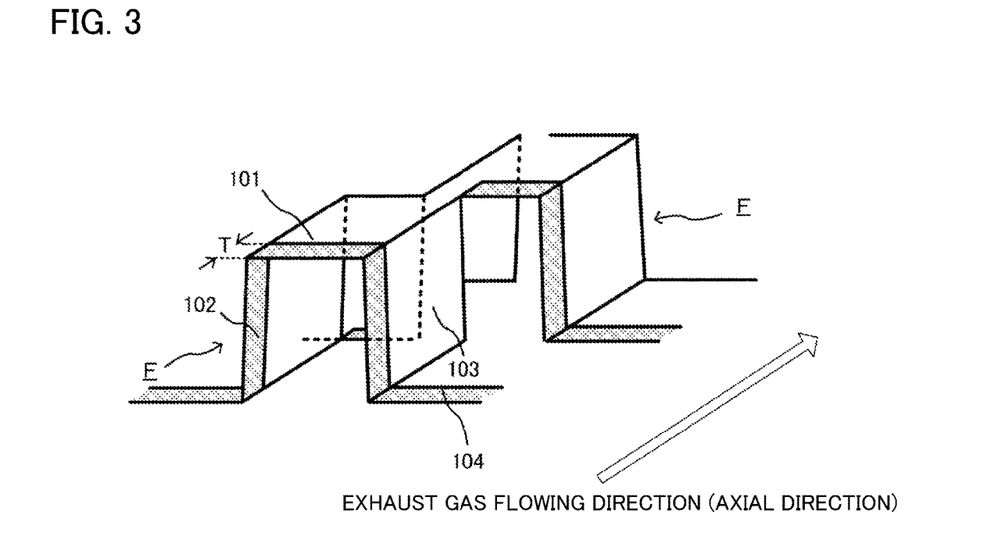
FIG. 3 is a perspective view of adjacent fins in an axial direction.

The present embodiment will be described below on the basis of the drawings. FIG. 1 is a schematic view of a catalyst carrier as viewed in an axial direction. A normal direction of a sheet surface corresponds to the axial direction, and a direction along the sheet surface corresponds to a radial direction. FIG. 2 is a development view in a part of a corrugated foil. A white arrow represents a direction in which exhaust gas flows (corresponding to the axial direction described above), and a part shown by hatching represents a top surface of a fin F. FIG. 3 is a perspective view of fins F adjacent to each other in the axial direction.

A catalyst carrier 1 includes a honeycomb core 10 and an outer jacket (mantle) 20, and is used as a catalytic converter for purifying exhaust gas. The catalyst carrier 1 can be used for a purification device of converting NOx contained in diesel exhaust gas into harmless substances. Specifically, the catalyst carrier 1 can be used as a DOC or a SCR that is provided in diesel exhaust gas treatment equipment. By the catalyst carrier 1 used as a DOC, hydrocarbons of unburned gas contained in exhaust gas are oxidized into water and carbon dioxide, carbon monoxide is oxidized into carbon dioxide, and nitrogen monoxide is oxidized into nitrogen dioxide. Nitrogen dioxide is gas having very high oxidation power. Therefore, when nitrogen dioxide comes into contact with PM deposited in a DPF disposed downstream of the DOC, PM is caused to be burned.

By the catalyst carrier 1 used as a SCR, a chemical reaction of nitrogen oxides contained in exhaust gas discharged from a DPF with ammonia is promoted, and the nitrogen oxides and ammonia are reduced into nitrogen and water. The ammonia is produced by jetting aqueous urea into the upstream side of the SCR through an injector from an aqueous urea tank and hydrolyzing the aqueous urea by heat of exhaust gas.

The honeycomb core 10 is configured so that a corrugated foil 30 and a flat foil 40 are laminated and wound around an axis. A cross section of the honeycomb core 10 in the radial direction has a circular shape. For the corrugated foil 30 and the flat foil 40, a stainless foil for carrying a catalyst can be used. A component for the stainless foil will be described below.

The corrugated foil 30 is formed into an offset structure with reference to the development view of FIG. 2. Herein, the offset structure means a structure in which phases of adjacent fins F in the axial direction are different. In this embodiment, fins F disposed in the axial direction are alternately arranged in a zigzag pattern. However, the offset structure is not limited to an arrangement in the zigzag pattern. The offset structure also includes another structure in which the phases of adjacent fins F in the axial direction are different as described below. The offset structure may be formed in the whole of the corrugated foil 30 or in only a part of the corrugated foil 30. When the corrugated foil 30 is formed into the offset structure as described above, the amount of exhaust gas to come into contact with the corrugated foil 30 increases. Thus, the purification performance of the catalyst carrier 1 can be enhanced.

Each of the fins F is provided with a top surface 101 and a pair of left oblique side 102 and right oblique side 103 that extend from both ends of the top surface 101. The left oblique side 102 and the right oblique side 103 are tilted so as to be widened as they separate from the top surface 101. Therefore, the fins F each have a trapezoidal shape as viewed in the axial direction.

The top surfaces 101 of the adjacent fins F in the axial direction are partially connected to each other. The adjacent fins F in a circumferential direction of the honeycomb core 10 are connected to each other through a joining part 104. Specifically, a lower end part of the right oblique side 103 of one of the adjacent fins F is connected to a lower end part of the left oblique side 102 of the other of the adjacent fins F. Thus, the adjacent fins F in the circumferential direction can be connected to each other. Therefore, since the corrugated foil 30 including the fins F arranged in the zigzag pattern becomes one board, the rigidity thereof can be enhanced.

In order to avoid the problem of wind erosion caused during application of the catalyst carrier 1 to the DOC or SCR provided in the diesel exhaust gas treatment equipment, an oxide film is formed on the end surface on the gas inlet side of each of the fins F, that is, a predetermined region T containing an exposed end surface that is exposed toward the gas inlet side, in this embodiment. The predetermined region T ranges from the exposed end surface to at least 2 mm. When a region of formed oxide film is smaller than 2 mm, wind erosion is likely to occur. In the partial perspective view of FIG. 3, the region of formed oxide film is shown by hatching. Since the predetermined region T is at least 2 mm, the predetermined region T may be more than 2 mm. The oxide film is formed also at the predetermined region T containing an exposed end surface that is exposed toward the gas inlet side in the flat foil 40. The predetermined region T is not repetitively described.

The oxide film contains 30% by mass or more and 99.9% by mass or less of $\alpha$-alumina with the balance including at least one of a second alumina, a Fe oxide, and a Cr oxide. The stainless foil for carrying a catalyst is subjected to a special heat treatment (hereinafter referred to as special heat treatment), to form the oxide film. The second alumina is at least one or more of $\gamma$, $\theta$, $\chi$, $\delta$, $\eta$, and $\kappa$ aluminas.

The thickness of the stainless foil constituting the corrugated foil and the flat foil of the honeycomb core of the present invention is 5 $\mu$m or more and 200 $\mu$m or less. When the thickness is 5 $\mu$m or more, the mechanical strength reaches the level of practical use. When it is 200 $\mu$m or less, the heat capacity decreases, and the light-off performance is improved.

Further, the stainless foil constituting the corrugated foil and the flat foil of the honeycomb core of the present invention contains at least Fe, Cr, and Al. The contained Al is used for formation of $\alpha$-alumina and the like on the surface of the stainless foil.

The total amount of Al contained in the stainless foil and the oxide film as $\alpha$-alumina and the like is desirably within a range of 1.5% by mass or more and 13% by mass or less. When the total amount of Al is less than 1.5% by mass, Al contained in the stainless foil is used for production of $\alpha$-alumina. Therefore, Al in the stainless foil may be depleted. In this case, the stainless foil is extraordinarily oxidized and frayed. Therefore, the total amount of Al is desirably 1.5% by mass or more. When the total amount of Al is more than 13% by mass, the toughness of the stainless foil remarkably decreases. The stainless foil is lost or cracked by pressure or vibration of exhaust gas, and the structure reliability is deteriorated. Accordingly, the maximum of total concentration of Al contained in the oxide film and the stainless foil is preferably 13% by mass or less.

The total amount of Cr contained in the stainless foil and the oxide film is desirably within a range of 9% by mass or more and 30% by mass or less. When the total amount of Cr is less than 9% by mass, $\alpha$-alumina becomes unstable, and an effect of improving oxidation resistance may be insufficient. When it is more than 30% by mass, steel becomes brittle and is not resistant to cold rolling and working.

The stainless foil may further contain at least one of Ti, Zr, Nb, Hf, Mg, Ca, Ba, Y, and a rare earth element.

Ti, Zr, Nb, and Hf have an effect of reducing the oxygen permeability of another oxide film formed as a foundation layer between the aforementioned oxide film containing $\alpha$-alumina and the stainless foil, and remarkably decreasing the oxidation rate. However, when the total amount of Ti, Zr, Nb, and Hf is more than 2.0% by mass, the deposition of intermetallic compound in the foil increases, and the foil is made brittle. Therefore, the total amount thereof is preferably 2.0% by mass or less.

Mg, Ca, and Ba also form a solid solution in alumina. The high-temperature oxidation resistance of the stainless foil may be improved. When the total amount of Mg, Ca, and Ba is more than 0.01% by mass, the toughness of the foil decreases. Therefore, the total amount is preferably 0.01% by mass or less.

Y and a rare earth element can be added as an element of securing the adhesion of the oxide film. When the total amount of Y and the rare earth element is more than 0.5% by mass, the deposition of intermetallic compound in the foil increases, and the toughness decreases. Therefore, the total amount is preferably 0.5% by mass or less.

The stainless foil further contains C, and Mn as unavoidable impurities.

C adversely affects the toughness, ductility, and oxidation resistance of the stainless foil. Therefore, it is desirable that the amount of C be small. In the present invention, when the amount of C is 0.1% by mass or less, damage can be allowed. Therefore, the upper limit thereof is desirably 0.1% by mass.

Si decreases the toughness and ductility of the stainless foil, and generally improves the oxidation resistance. However, when the amount of Si is more than 2% by mass, there is a problem in which not only the effect is decreased, but also the toughness is deteriorated. Therefore, the amount of Si is preferably 2% by mass or less.

When Mn is contained in an amount of more than 2% by mass, the oxidation resistance of the stainless foil is deteriorated. The upper limit of the amount of Mn is thus preferably 2% by mass.

The reason of limitation of component of the oxide film will be described.

$\alpha$-alumina is represented by a molecular formula of $Al_2O_3$, has a typical corundum crystalline structure (hexagonal crystal), and exerts excellent resistance to wind erosion of particles contained in exhaust gas. Therefore, the lower limit of amount of $\alpha$-alumina contained in the oxide film is 30% by mass. When the stainless foil is subjected to a special heat treatment, at least one or more of the second alumina including at least one of $\gamma$, $\theta$, $\chi$, $\delta$, $\eta$, and $\kappa$ aluminas, the Fe oxide, and the Cr oxide is necessarily formed. Therefore, the whole of the oxide film cannot be formed from $\alpha$-alumina. Accordingly, the upper limit of amount of $\alpha$-alumina contained in the oxide film is 99.9% by mass. When the amount of $\alpha$-alumina is 40% by mass or more, the hardness of the oxide film increases, and excellent resistance to wind erosion is achieved. Therefore, the lower limit thereof is more preferably 40% by mass. When the upper limit thereof is 99.5% by mass or less, the toughness of the oxide film is improved, and the oxide film is unlikely to be cracked or peeled. Therefore, the upper limit thereof is more preferably 99.5% by mass.

The content of Fe contained in the oxide film is preferably 0.1% by mass or more and 7% by mass or less. When the content of Fe is less than 0.1% by mass, the toughness of the oxide film is deteriorated, and the oxide film is likely to be cracked or peeled. Therefore, the content of Fe is 0.1% by mass or more. When the content of Fe is more than 7% by mass, Fe may elute into the catalyst layer to remarkably decrease the purification performance. Therefore, the content of Fe is 7% by mass or less.

The content of Cr contained in the oxide film is preferably 0.1% by mass or more and 4% by mass or less. When the content of Cr is less than 0.1% by mass, the toughness of the oxide film is deteriorated, and the oxide film is likely to be cracked or peeled. Therefore, the content of Cr is 0.1% by mass or more. When the content of Cr is more than 4% by mass, Cr may elute into the catalyst layer to remarkably reduce the purification performance. Therefore, the content of Cr is 4% by mass or less.

Figure 4:
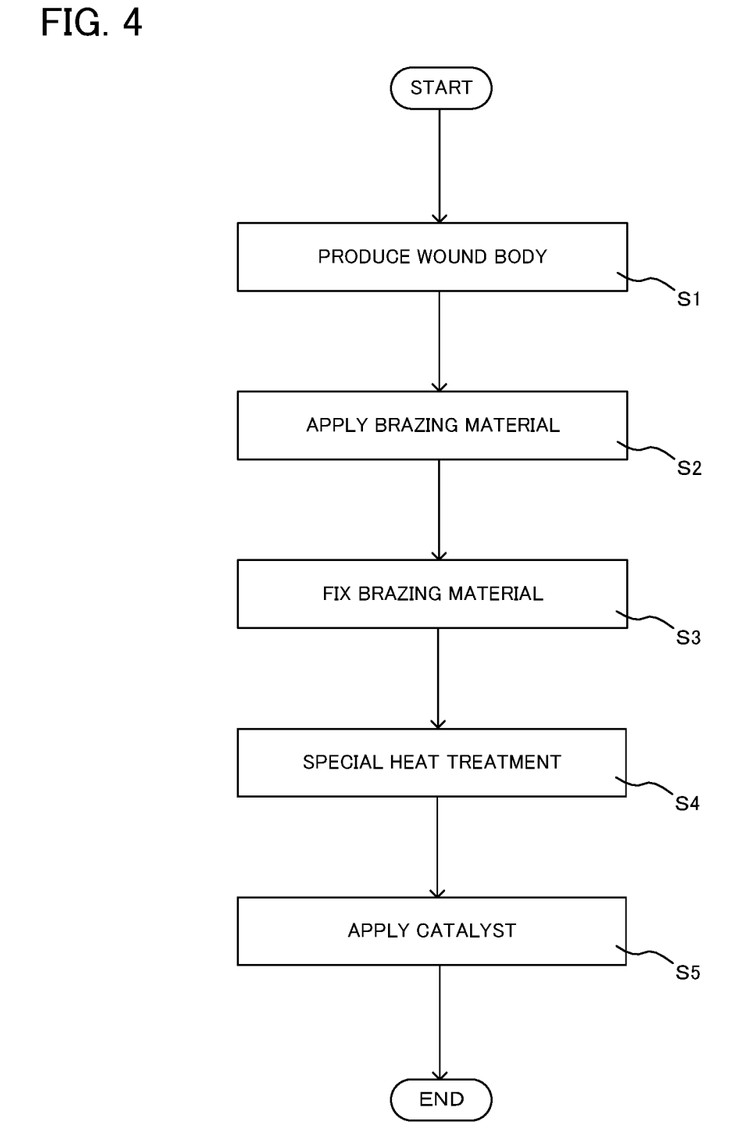
FIG. 4 is a flow chart illustrating a method for producing a catalyst carrier.

Next, a method for producing the catalyst carrier in this embodiment including a special heat treatment will be described with reference to the flowchart of FIG. 4. In Step S1, a band-shaped extending stainless foil is subjected to press working, to form unevenness, and the stainless foil is wound around a predetermined axis while the stainless foil is laminated on a flat foil. Thus, the honeycomb core 10 is produced.

In Step S2, the honeycomb core 10 is inserted into a tube-shaped outer jacket 20 formed from stainless, and a brazing material is applied to parts to be bonded of the honeycomb core 10 and the outer jacket 20. In Step S3, the honeycomb core 10 and the outer jacket 20 to which the brazing material is applied are subjected to a heat treatment in a vacuum atmosphere. Thus, the brazing material is fixed.

In Step S4, the special heat treatment is performed. In this special heat treatment of the honeycomb core 10 that is inserted into the outer jacket 20, gas is passed from an end part on an inlet side to an end part on an outlet side of the honeycomb core 10 under conditions of specific atmosphere and temperature. The specific atmosphere is an atmosphere where the oxygen partial pressure is about 10 Pa to air pressure or an oxidizing atmosphere where the water vapor dew point is controlled. The atmosphere temperature is controlled to 850° C. to 1,300° C. When the atmosphere temperature is lower than 850° C., the content of $\alpha$-alumina contained in the oxide film cannot be increased to 30% by mass or more.

As gas, gas in the specific atmosphere can be used as it is. The flow rate of gas is a space velocity (SV) value per the honeycomb core, and is desirably 0.1 (1/h) to 100 (1/h). When the SV value is less than 0.1 (1/h), the content of $\alpha$-alumina contained in the oxide film formed on the end surface on the inlet side of each fin F may be decreased to less than 30% by mass. Therefore, in order to increase the content of $\alpha$-alumina to 30% by mass or more, it is necessary that the atmosphere temperature be set to 850° C. or higher and the SV value be set to 0.1 (1/h) or more. The inventors of the present invention confirmed from experiments that when any one of the atmosphere temperature and the SV value is not satisfied, the content of $\alpha$-alumina does not reach 30% by mass. When the SV value is more than 100 (1/h), an effect of increasing the content of $\alpha$-alumina is saturated.

The gas flowed into each flow channel of the honeycomb core 10 moves toward end surfaces on an outlet side of the honeycomb core 10 while the gas collides with the end surface on the inlet side of each fin F. At that time, a wall surface of each fin F in contact with the gas is wholly oxidized. However, since the gas directly collides with the end surface on the inlet side of each fin F, an oxide film having components different from those for an oxide film of a wall surface other than the end surface on the inlet side, that is, an oxide film that contains 30% by mass or more of $\alpha$-alumina and has excellent resistance to wind erosion is formed on the end surface on the inlet side. On the other hand, an oxide film formed on the end surface on the gas outlet side may not be necessarily the oxide film in the present invention. For example, an oxide film in which the content of $\alpha$-alumina is 10% by mass or more and less than 30% by mass is not a problem.

The thickness of the oxide film can be varied by adjusting the flowing time of the gas described above. The thickness of the oxide film is preferably 100 nm or more and 10 µm or less. When the thickness of the oxide film is less than 100 nm, an effect of protecting end surfaces on the inlet side of the fins F against wind erosion is deteriorated. When the thickness of the oxide film is more than 10 µm, the oxide film is likely to be cracked, and occurrence of troubles such as peeling increases.

In this embodiment, the honeycomb core 10 is exposed to a heating atmosphere, and at the same time, gas in such an atmosphere is jetted from the end surface on the inlet side of the honeycomb core 10, as described above. Thus, an oxidation treatment is performed. Therefore, an oxide film containing 30% by mass or more of $\alpha$-alumina and having excellent resistant to wind erosion can be formed at the predetermined region T containing the end surface on the inlet side of each of the fins F. The honeycomb core 10 and the outer jacket 20 that are produced by performing Steps S1 to S4 correspond to a metal substrate for catalytic converter described in the scope of claims.

In Step S5, the honeycomb core 10 having the oxide film formed at the predetermined region T containing the end surface on the inlet side of each of the fins F and the outer jacket 20 are immersed in a catalyst bath, so that the catalyst carrier 1 is produced.

The present invention will be specifically described by illustrating Examples.

EXAMPLE 1

The content of $\alpha$-alumina contained in an oxide film was adjusted, and the resistance to wind erosion of each catalyst carrier was evaluated. Each of the catalyst carriers was applied to a DOC provided in diesel exhaust gas treatment equipment, and a driving test corresponding to 200,000 (km) was performed. The wind erosion and purification performance of the catalyst carriers were evaluated. In evaluation of wind erosion, the weights of each of the catalyst carriers before and after the test were compared. When the decrease in weight is 1% by mass or less, the wind erosion is evaluated to be favorable, which is represented by very good. When the decrease in weight is more than 1.0% by mass, the wind erosion is evaluated to be poor, which is represented by bad.

The purification performance was evaluated by a deterioration ratio of the final performance to the initial performance. When the deterioration ratio is 30% or less, the deterioration of purification performance is very low, and the purification performance is evaluated by very good. When the deterioration ratio is more than 30% and less than 40%, the deterioration of purification performance is low, and the purification performance is evaluated by good. When the deterioration ratio is 40% or more, the deterioration of purification performance is high, and the purification performance is evaluated by bad. The initial performance is purification performance measured when a cumulative time in which the catalyst temperature is 900° C. reaches 1 hour. The purification performance was measured as purification ratios of CO, HC, and NOx. The final performance is purification performance measured when the cumulative time in which the catalyst temperature is 900° C. reaches 500 hours. In Table 1, the test results are summarized.

"REM" described in columns of added element represents an abbreviation of misch metal.

TABLE 1

| NUMBER | THICKNESS OF FOIL μm | FOIL COMPONENT (INCLUDING OXIDE) | | | | |
|---|---|---|---|---|---|---|
| | | Cr % BY MASS | Al % BY MASS | Fe % BY MASS | ADDED ELEMENT % BY MASS | UNAVOIDABLE IMPURITIES % BY MASS |
| 1 | 30 | 20.1 | 5.2 | 73.2 | 0.08% Ti, 0.09% REM | C, Si, Mn |
| 2 | 30 | 20.1 | 5.2 | 73.2 | 0.08% Ti, 0.09% REM | C, Si, Mn |
| 3 | 30 | 20.1 | 5.2 | 73.2 | 0.08% Ti, 0.09% REM | C, Si, Mn |
| 4 | 30 | 20.1 | 5.2 | 73.2 | 0.08% Ti, 0.09% REM | C, Si, Mn |
| 5 | 30 | 20.1 | 5.2 | 73.2 | 0.08% Ti, 0.09% REM | C, Si, Mn |
| 6 | 30 | 20.1 | 5.2 | 73.2 | 0.08% Ti, 0.09% REM | C, Si, Mn |
| 7 | 30 | 20.1 | 5.2 | 73.2 | 0.08% Ti, 0.09% REM | C, Si, Mn |
| 8 | 30 | 20.1 | 5.2 | 73.2 | 0.08% Ti, 0.09% REM | C, Si, Mn |
| 9 | 30 | 20.1 | 5.2 | 73.2 | 0.08% Ti, 0.09% REM | C, Si, Mn |
| 10 | 30 | 20.1 | 5.2 | 73.2 | 0.08% Ti, 0.09% REM | C, Si, Mn |
| 11 | 30 | 20.1 | 5.2 | 73.2 | 0.08% Ti, 0.09% REM | C, Si, Mn |
| 12 | 30 | 20.1 | 5.2 | 73.2 | 0.08% Ti, 0.09% REM | C, Si, Mn |
| 13 | 30 | 20.1 | 5.2 | 73.2 | 0.08% Ti, 0.09% REM | C, Si, Mn |
| 14 | 30 | 20.1 | 5.2 | 73.2 | 0.08% Ti, 0.09% REM | C, Si, Mn |
| 15 | 30 | 20.1 | 5.2 | 73.2 | 0.08% Ti, 0.09% REM | C, Si, Mn |
| 16 | 20 | 19.8 | 7.5 | 71.5 | 0.10% Zr 0.11% La | C, Si, Mn |
| 17 | 20 | 19.8 | 7.5 | 71.5 | 0.10% Zr 0.11% La | C, Si, Mn |
| 18 | 20 | 19.8 | 7.5 | 71.5 | 0.10% Zr 0.11% La | C, Si, Mn |
| 19 | 20 | 19.8 | 7.5 | 71.5 | 0.10% Zr 0.11% La | C, Si, Mn |
| 20 | 20 | 19.8 | 7.5 | 71.5 | 0.10% Zr 0.11% La | C, Si, Mn |
| 21 | 20 | 19.8 | 7.5 | 71.5 | 0.10% Zr 0.11% La | C, Si, Mn |
| 22 | 20 | 19.8 | 7.5 | 71.5 | 0.10% Zr 0.11% La | C, Si, Mn |
| 23 | 20 | 19.8 | 7.5 | 71.5 | 0.10% Zr 0.11% La | C, Si, Mn |
| 24 | 20 | 19.8 | 7.5 | 71.5 | 0.10% Zr 0.11% La | C, Si, Mn |
| 25 | 20 | 19.8 | 7.5 | 71.5 | 0.10% Zr 0.11% La | C, Si, Mn |
| 26 | 20 | 19.8 | 7.5 | 71.5 | 0.10% Zr 0.11% La | C, Si, Mn |
| 27 | 20 | 19.8 | 7.5 | 71.5 | 0.10% Zr 0.11% La | C, Si, Mn |
| 28 | 20 | 19.8 | 7.5 | 71.5 | 0.10% Zr 0.11% La | C, Si, Mn |
| 29 | 20 | 19.8 | 7.5 | 71.5 | 0.10% Zr 0.11% La | C, Si, Mn |
| 30 | 20 | 19.8 | 7.5 | 71.5 | 0.10% Zr 0.11% La | C, Si, Mn |
| 31 | 50 | 9 | 3.5 | 86.1 | 0.1% Nb, 0.09% Hf | C, Si, Mn |
| 32 | 50 | 15 | 3.5 | 80.1 | 0.1% Nb, 0.09% Hf | C, Si, Mn |
| 33 | 50 | 25 | 3.5 | 70.2 | 0.1% Nb, 0.09% Hf | C, Si, Mn |
| 34 | 50 | 30 | 3.5 | 65.2 | 0.1% Nb, 0.09% Hf | C, Si, Mn |
| 35 | 50 | 20.5 | 1.5 | 76.7 | 0.1% Zr, 0.03% La, 0.05% Ce | C, Si, Mn |
| 36 | 50 | 20.5 | 10.3 | 68.1 | 0.1% Zr, 0.03% La, 0.05% Ce | C, Si, Mn |
| 37 | 50 | 20.5 | 13 | 65.4 | 0.1% Zr, 0.03% La, 0.05% Ce | C, Si, Mn |

| NUMBER | HEAT TREATMENT | | | | | OXIDE FILM AT REGION RANGING FROM SURFACE ON INLET SIDE END TO 2 mm | | SECOND |
|---|---|---|---|---|---|---|---|---|
| | TEMPERATURE ° C. | TIME h | ATMOSPHERE | SV VALUE h−1 | OFFSET | THICKNESS μm | α-ALUMINA % BY MASS | ALUMINA % BY MASS |
| 1 | 900 | 1 | AIR | 1 | NONE | 0.5 | 46 | 50 |
| 2 | | | NONE | | PRESENCE | 0 | 0 | 0 |
| 3 | 700 | 1 | AIR | 1 | PRESENCE | 0.2 | 13 | 28 |
| 4 | 800 | 1 | AIR | 1 | PRESENCE | 0.4 | 27 | 38 |
| 5 | 850 | 1 | AIR | 1 | PRESENCE | 0.5 | 31 | 45 |
| 6 | 900 | 1 | AIR | 0.01 | PRESENCE | 0.6 | 28 | 38 |
| 7 | 900 | 1 | AIR | 0.1 | PRESENCE | 0.6 | 35 | 53 |
| 8 | 900 | 1 | AIR | 1 | PRESENCE | 0.6 | 47 | 42 |
| 9 | 900 | 1 | AIR | 10 | PRESENCE | 0.7 | 51 | 37 |
| 10 | 900 | 1 | AIR | 100 | PRESENCE | 0.7 | 53 | 35 |
| 11 | 900 | 0.1 | AIR | 1 | PRESENCE | 0.2 | 46 | 42 |
| 12 | 900 | 10 | AIR | 1 | PRESENCE | 1.7 | 65 | 23 |
| 13 | 1000 | 1 | AIR | 1 | PRESENCE | 1.5 | 77 | 17 |
| 14 | 1100 | 1 | AIR | 1 | PRESENCE | 3.5 | 85 | 12 |
| 15 | 1200 | 1 | AIR | 1 | PRESENCE | 6.8 | 99.8 | 0.2 |
| 16 | 900 | 1 | AIR | 1 | NONE | 0.5 | 48 | 47 |
| 17 | | | NONE | | PRESENCE | 0 | 0 | 0 |
| 18 | 700 | 1 | AIR | 1 | PRESENCE | 0.15 | 17 | 26 |
| 19 | 800 | 1 | AIR | 1 | PRESENCE | 0.36 | 28 | 36 |
| 20 | 850 | 1 | AIR | 1 | PRESENCE | 0.52 | 32 | 52 |
| 21 | 900 | 1 | AIR | 0.01 | PRESENCE | 0.6 | 28 | 35 |
| 22 | 900 | 1 | AIR | 0.1 | PRESENCE | 0.6 | 37 | 54 |
| 23 | 900 | 1 | AIR | 1 | PRESENCE | 0.6 | 48 | 43 |
| 24 | 900 | 1 | AIR | 10 | PRESENCE | 0.7 | 53 | 38 |

TABLE 1-continued

| | | | | | | | | |
|---|---|---|---|---|---|---|---|---|
| 25 | 900 | 1 | AIR | 100 | PRESENCE | 0.7 | 55 | 36 |
| 26 | 900 | 0.1 | AIR | 1 | PRESENCE | 0.2 | 48 | 43 |
| 27 | 900 | 10 | AIR | 1 | PRESENCE | 1.8 | 69 | 23 |
| 28 | 1000 | 1 | AIR | 1 | PRESENCE | 1.5 | 81 | 15 |
| 29 | 1100 | 1 | AIR | 1 | PRESENCE | 3.5 | 91 | 5 |
| 30 | 1200 | 1 | AIR | 1 | PRESENCE | 6.8 | 99.5 | 0 |
| 31 | 950 | 2 | AIR | 5 | PRESENCE | 0.5 | 48 | 39 |
| 32 | 950 | 2 | AIR | 5 | PRESENCE | 0.5 | 53 | 36 |
| 33 | 950 | 2 | AIR | 5 | PRESENCE | 0.5 | 56 | 34 |
| 34 | 950 | 2 | AIR | 5 | PRESENCE | 0.5 | 59 | 32 |
| 35 | 875 | 2 | AIR | 5 | PRESENCE | 0.35 | 39 | 53 |
| 36 | 875 | 2 | AIR | 5 | PRESENCE | 0.45 | 72 | 17 |
| 37 | 875 | 2 | AIR | 5 | PRESENCE | 0.5 | 85 | 11 |

| | OXIDE FILM AT REGION RANGING FROM SURFACE ON INLET SIDE END TO 2 mm | | | | EVALUATION | | |
|---|---|---|---|---|---|---|---|
| NUMBER | Fe OXIDE | Fe CONTENT % BY MASS | Cr OXIDE | Cr CONTENT % BY MASS | WIND EROSION | PURIFICATION PERFORMANCE | REMARK |
| 1 | PRESENCE | 1.5 | PRESENCE | 0.7 | very good | bad | COMPARATIVE EXAMPLE 1 |
| 2 | NONE | 0 | NONE | 0 | bad | very good | COMPARATIVE EXAMPLE 2 |
| 3 | PRESENCE | 30 | PRESENCE | 12 | bad | good | COMPARATIVE EXAMPLE 3 |
| 4 | PRESENCE | 16 | PRESENCE | 9 | bad | good | COMPARATIVE EXAMPLE 4 |
| 5 | PRESENCE | 7 | PRESENCE | 4 | very good | very good | EXAMPLE 1 OF INVENTION |
| 6 | PRESENCE | 16 | PRESENCE | 7 | bad | good | COMPARATIVE EXAMPLE 5 |
| 7 | PRESENCE | 4 | PRESENCE | 3 | very good | very good | EXAMPLE 2 OF INVENTION |
| 8 | PRESENCE | 4 | PRESENCE | 3 | very good | very good | EXAMPLE 3 OF INVENTION |
| 9 | PRESENCE | 4 | PRESENCE | 3 | very good | very good | EXAMPLE 4 OF INVENTION |
| 10 | PRESENCE | 4 | PRESENCE | 3 | very good | very good | EXAMPLE 5 OF INVENTION |
| 11 | PRESENCE | 4 | PRESENCE | 3 | very good | very good | EXAMPLE 6 OF INVENTION |
| 12 | PRESENCE | 4 | PRESENCE | 3 | very good | very good | EXAMPLE 7 OF INVENTION |
| 13 | PRESENCE | 1.8 | PRESENCE | 0.3 | very good | very good | EXAMPLE 8 OF INVENTION |
| 14 | PRESENCE | 0.4 | NONE | 0.1 | very good | very good | EXAMPLE 9 OF INVENTION |
| 15 | NONE | 0 | NONE | 0 | very good | very good | EXAMPLE 10 OF INVENTION |
| 16 | PRESENCE | 1.5 | PRESENCE | 0.7 | very good | bad | COMPARATIVE EXAMPLE 6 |
| 17 | NONE | 0 | NONE | 0 | bad | very good | COMPARATIVE EXAMPLE 7 |
| 18 | PRESENCE | 28 | PRESENCE | 11 | bad | good | COMPARATIVE EXAMPLE 8 |
| 19 | PRESENCE | 16 | PRESENCE | 8 | bad | good | COMPARATIVE EXAMPLE 9 |
| 20 | PRESENCE | 7 | PRESENCE | 3 | very good | very good | EXAMPLE 11 OF INVENTION |
| 21 | PRESENCE | 17 | PRESENCE | 8 | bad | good | COMPARATIVE EXAMPLE 10 |
| 22 | PRESENCE | 3 | PRESENCE | 1 | very good | very good | EXAMPLE 12 OF INVENTION |
| 23 | PRESENCE | 3 | PRESENCE | 1 | very good | very good | EXAMPLE 13 OF INVENTION |
| 24 | PRESENCE | 3 | PRESENCE | 1 | very good | very good | EXAMPLE 14 OF INVENTION |
| 25 | PRESENCE | 3 | PRESENCE | 1 | very good | very good | EXAMPLE 15 OF INVENTION |
| 26 | PRESENCE | 3 | PRESENCE | 1 | very good | very good | EXAMPLE 16 OF INVENTION |
| 27 | PRESENCE | 3 | PRESENCE | 1 | very good | very good | EXAMPLE 17 OF INVENTION |
| 28 | PRESENCE | 1.1 | NONE | 0 | very good | very good | EXAMPLE 18 OF INVENTION |
| 29 | PRESENCE | 0.5 | NONE | 0 | very good | very good | EXAMPLE 19 OF INVENTION |

TABLE 1-continued

| | | | | | | | | |
|---|---|---|---|---|---|---|---|---|
| 30 | PRESENCE | 0.2 | NONE | 0 | very good | very good | EXAMPLE 20 OF INVENTION |
| 31 | PRESENCE | 7 | NONE | 0 | very good | very good | EXAMPLE 21 OF INVENTION |
| 32 | PRESENCE | 5 | PRESENCE | 1.5 | very good | very good | EXAMPLE 22 OF INVENTION |
| 33 | PRESENCE | 2 | PRESENCE | 3.5 | very good | very good | EXAMPLE 23 OF INVENTION |
| 34 | NONE | 0 | PRESENCE | 4 | very good | very good | EXAMPLE 24 OF INVENTION |
| 35 | PRESENCE | 6 | PRESENCE | 4 | very good | very good | EXAMPLE 25 OF INVENTION |
| 36 | PRESENCE | 4 | PRESENCE | 2 | very good | very good | EXAMPLE 26 OF INVENTION |
| 37 | PRESENCE | 3 | PRESENCE | 1 | very good | very good | EXAMPLE 27 OF INVENTION |

Since the catalyst carriers of Comparative Examples 1 and 6 did not have an offset structure, the purification performance was evaluated by bad. Since a special heat treatment for forming an oxide film containing α-alumina on an end surface on a gas inlet side of each of fins F was not performed in Comparative Examples 2 and 7, the wind erosion was evaluated by bad. Since the heating temperature in the special heat treatment in Comparative Examples 3, 4, 8, and 9 was less than 850° C., the content of α-alumina contained in the oxide film on the end surface on the gas inlet side was less than 30% by mass, and the wind erosion was evaluated by bad. Since the contents of Fe and Cr contained in the oxide film formed on the end surface on the gas inlet side of each of the fins F in Comparative Examples 3, 4, 8, and 9 were more than 7% by mass and more than 4% by mass, respectively, the purification performance was evaluated by good. Since the SV values in Comparative Examples 5 and 10 were less than 0.1 (1/h), the content of α-alumina contained in the oxide film on the end surface on the gas inlet side was less than 30% by mass, and the wind erosion was evaluated by bad. Since the contents of Fe and Cr contained in the oxide film formed on the end surface on the gas inlet side of each of the fins F in Comparative Examples 5 and 10 were more than 7% by mass and more than 4% by mass, respectively, the purification performance was evaluated by good.

(Modification 1)

In the aforementioned embodiment, the special heat treatment in Step S4 is performed after the brazing treatment in Step S3. However, the present invention is not limited to this embodiment. A surface state of a stainless foil may be prepared before the special heat treatment in Step S4 by baking in vacuum in which the oxygen partial pressure is about $10^{-2}$ Pa or in a reduction atmosphere such as hydrogen and carbon monoxide. Thus, the aforementioned oxide film may be efficiently formed.

(Modification 2)

Figure 5:
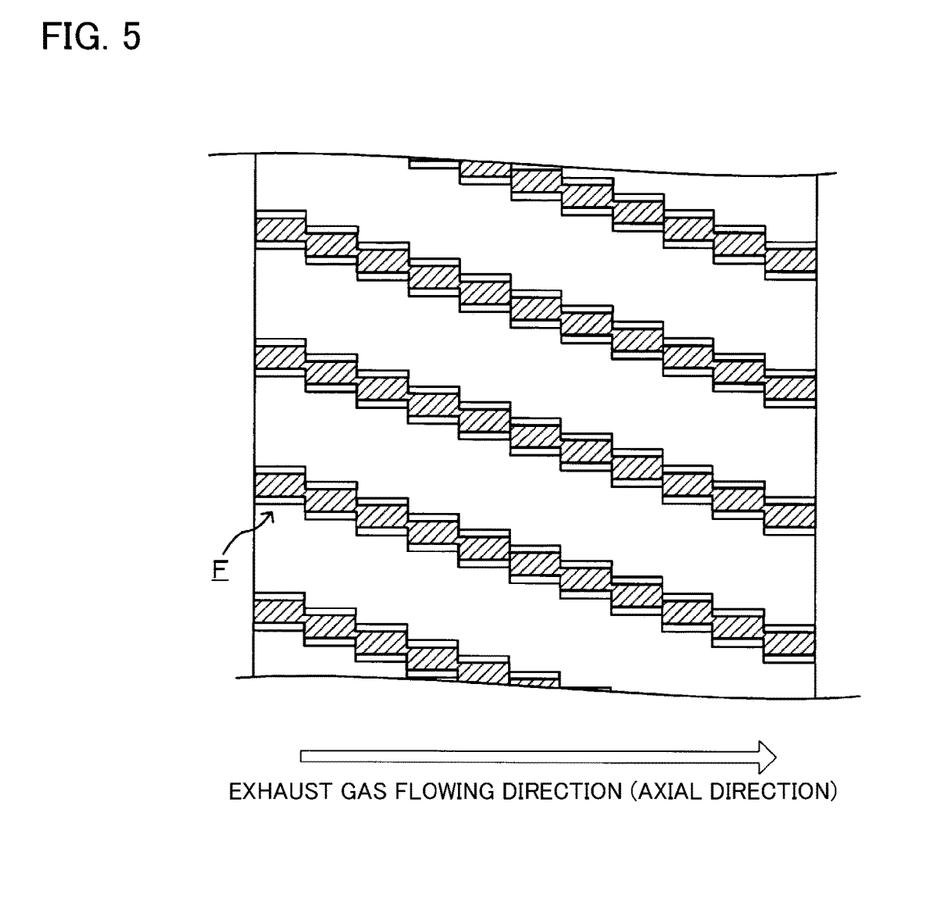
FIG. 5 shows a modification of an offset structure in which fins are arranged in an inclined direction.
Figure 6:
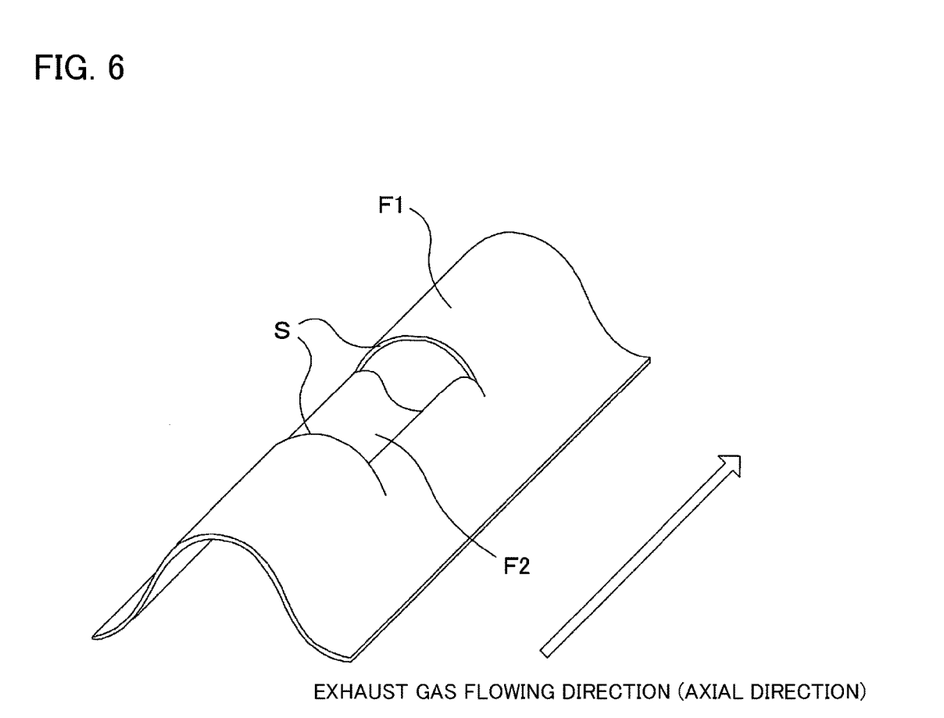
FIG. 6 shows a modification of an offset structure in which a part of a corrugated foil is bent downward.

In the aforementioned embodiment, fins F are arranged in a zigzag pattern. However, the present invention is not limited to this embodiment. A catalyst carrier may have another configuration as long as it has an offset structure having different wave phases between the front and rear in the axial direction. For example, the invention of the present application can also be applied to a corrugated foil having an offset structure in which fins F are arranged in an inclined direction relative to the axial direction, as illustrated in FIG. 5. In this case, an oxide film having excellent resistance to wind erosion can be formed on an end surface on a gas inlet side (corresponding to exposed end surface) of each of fins F. The invention of the present application can also be applied to a corrugated foil illustrated in FIG. 6. Specifically, the invention of the present application can also be applied to an offset structure in which an upward convex fin F1 and a downward convex fin F2 are formed by forming a pair of slits S in the corrugated foil and putting a region between the pair of slits S downward. In this case, an oxide film having excellent resistance to wind erosion can be formed on an end surface on a gas inlet side of the fin F1 and an end surface on a gas inlet side of the fin F2.

(Modification 3)

In the aforementioned embodiment, an example in which the catalyst carrier 1 is used for a purification device for purifying diesel exhaust gas is described. However, the present invention is not limited to this embodiment. The catalyst carrier 1 can also be applied to a purification device for purifying exhaust gas from combustion of gasoline.

(Modification 4)

In the flat foil 40, a plurality of openings may be intermittently formed. Exhaust gas flowed into each flow channel of the honeycomb core 10 passes through each opening and is divided and flows through another adjacent flow channel. Therefore, turbulent flow is likely to occur, and the exhaust gas purification performance can be enhanced. When a special heat treatment is performed, gas passes through each opening. At that time, the oxide film of the invention of the present application containing 30% by mass or more of α-alumina can be formed mainly at an edge part on a downstream side of the openings.

The invention claimed is:

1. A metal substrate for catalytic converter for purifying exhaust gas, the metal substrate comprising a honeycomb core including a flat metal foil and a corrugated metal foil, the flat metal foil and the corrugated metal foil being layered, wherein
   the corrugated foil has an offset part having different wave phases between front and rear in an axial direction of the honeycomb core,
   the offset part has an oxide film formed on an exposed end surface that is exposed toward at least a gas inlet side,
   the oxide film contains 30% by mass or more and 99.9% by mass or less of a first alumina with the balance comprising at least one of a second alumina, a Fe oxide, and a Cr oxide,
   the first alumina comprises α-alumina, and
   the second alumina comprises at least one or more of γ, θ, χ, δ, η, and κ aluminas.

2. The metal substrate for catalytic converter according to claim 1, wherein a content of Fe contained in the oxide film is 0.1% by mass or more and 7% by mass or less.

3. The metal substrate for catalytic converter according to claim 2, wherein a content of Cr contained in the oxide film is 0.1% by mass or more and 4% by mass or less.

4. The metal substrate for catalytic converter according to claim 3, wherein the oxide film has a thickness of 100 nm or more and 10 µm or less.

5. The metal substrate for catalytic converter according to claim 4, wherein
the honeycomb core is formed from a stainless foil, and contains at least Fe, Cr, and Al,
a total amount of Cr contained in the stainless foil and the oxide film of the honeycomb core is 9% by mass or more and 30% by mass or less, and
a total amount of Al contained in the stainless foil and the oxide film of the honeycomb core is 1.5% by mass or more and 13% by mass or less.

6. The metal substrate for catalytic converter according to claim 3, wherein
the honeycomb core is formed from a stainless foil, and contains at least Fe, Cr, and Al,
a total amount of Cr contained in the stainless foil and the oxide film of the honeycomb core is 9% by mass or more and 30% by mass or less, and
a total amount of Al contained in the stainless foil and the oxide film of the honeycomb core is 1.5% by mass or more and 13% by mass or less.

7. The metal substrate for catalytic converter according to claim 2, wherein the oxide film has a thickness of 100 nm or more and 10 µm or less.

8. The metal substrate for catalytic converter according to claim 7, wherein
the honeycomb core is formed from a stainless foil, and contains at least Fe, Cr, and Al,
a total amount of Cr contained in the stainless foil and the oxide film of the honeycomb core is 9% by mass or more and 30% by mass or less, and
a total amount of Al contained in the stainless foil and the oxide film of the honeycomb core is 1.5% by mass or more and 13% by mass or less.

9. The metal substrate for catalytic converter according to claim 2, wherein
the honeycomb core is formed from a stainless foil, and contains at least Fe, Cr, and Al,
a total amount of Cr contained in the stainless foil and the oxide film of the honeycomb core is 9% by mass or more and 30% by mass or less, and
a total amount of Al contained in the stainless foil and the oxide film of the honeycomb core is 1.5% by mass or more and 13% by mass or less.

10. A catalyst carrier comprising:
the metal substrate for catalytic converter according to claim 2; and
a catalyst carried on the flat foil and the corrugated foil.

11. The metal substrate for catalytic converter according to claim 1, wherein a content of Cr contained in the oxide film is 0.1% by mass or more and 4% by mass or less.

12. The metal substrate for catalytic converter according to claim 11, wherein the oxide film has a thickness of 100 nm or more and 10 µm or less.

13. The metal substrate for catalytic converter according to claim 12, wherein
the honeycomb core is formed from a stainless foil, and contains at least Fe, Cr, and Al,
a total amount of Cr contained in the stainless foil and the oxide film of the honeycomb core is 9% by mass or more and 30% by mass or less, and
a total amount of Al contained in the stainless foil and the oxide film of the honeycomb core is 1.5% by mass or more and 13% by mass or less.

14. The metal substrate for catalytic converter according to claim 11, wherein
the honeycomb core is formed from a stainless foil, and contains at least Fe, Cr, and Al,
a total amount of Cr contained in the stainless foil and the oxide film of the honeycomb core is 9% by mass or more and 30% by mass or less, and
a total amount of Al contained in the stainless foil and the oxide film of the honeycomb core is 1.5% by mass or more and 13% by mass or less.

15. The metal substrate for catalytic converter according to claim 1, wherein the oxide film has a thickness of 100 nm or more and 10 µm or less.

16. The metal substrate for catalytic converter according to claim 15, wherein
the honeycomb core is formed from a stainless foil, and contains at least Fe, Cr, and Al,
a total amount of Cr contained in the stainless foil and the oxide film of the honeycomb core is 9% by mass or more and 30% by mass or less, and
a total amount of Al contained in the stainless foil and the oxide film of the honeycomb core is 1.5% by mass or more and 13% by mass or less.

17. The metal substrate for catalytic converter according to claim 1, wherein
the honeycomb core is formed from a stainless foil, and contains at least Fe, Cr, and Al,
a total amount of Cr contained in the stainless foil and the oxide film of the honeycomb core is 9% by mass or more and 30% by mass or less, and
a total amount of Al contained in the stainless foil and the oxide film of the honeycomb core is 1.5% by mass or more and 13% by mass or less.

18. A catalyst carrier comprising:
the metal substrate for catalytic converter according to claim 1; and
a catalyst carried on the flat foil and the corrugated foil.

19. The catalyst carrier according to claim 18, used for a purification device for purifying diesel exhaust gas.

20. The catalyst carrier according to claim 18, used for a purification device for purifying exhaust gas from combustion of gasoline.

* * * * *